(12) United States Patent
Xu et al.

(10) Patent No.: US 12,493,590 B2
(45) Date of Patent: Dec. 9, 2025

(54) METHOD AND SYSTEM FOR DEDUPLICATING POINT OF INTEREST DATABASES

(71) Applicant: GRABTAXI HOLDINGS PTE. LTD., Singapore (SG)

(72) Inventors: Wenjie Xu, Singapore (SG); Sien Yi Tan, Singapore (SG); Yosua Michael Maranatha, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/036,258

(22) PCT Filed: Jan. 3, 2022

(86) PCT No.: PCT/SG2022/050002
§ 371 (c)(1),
(2) Date: May 10, 2023

(87) PCT Pub. No.: WO2022/164387
PCT Pub. Date: Aug. 4, 2022

(65) Prior Publication Data
US 2023/0306004 A1    Sep. 28, 2023

(30) Foreign Application Priority Data

Jan. 26, 2021    (SG) .......................... 10202100842W

(51) Int. Cl.
*G06F 16/215* (2019.01)
*G06F 16/28* (2019.01)
*G06F 16/29* (2019.01)

(52) U.S. Cl.
CPC .......... *G06F 16/215* (2019.01); *G06F 16/285* (2019.01); *G06F 16/29* (2019.01)

(58) Field of Classification Search
CPC .... G06F 16/215; G06F 16/285; G06F 16/288; G06F 16/29; G06F 18/22; G06F 18/23
See application file for complete search history.

(56) References Cited

U.S. PATENT DOCUMENTS

| | | | |
|---|---|---|---|
| 8,484,168 | B2 | 7/2013 | Bayliss |
| 8,719,302 | B2 | 5/2014 | Bailey et al. |

(Continued)

FOREIGN PATENT DOCUMENTS

| | | |
|---|---|---|
| CN | 104050196 A | 9/2014 |
| CN | 105224660 A | 1/2016 |
| CN | 110795515 A | 2/2020 |

OTHER PUBLICATIONS

William E Winkler: "Overview of Record Linkage and Current Research Directions", Nov. 13, 2005, Research Report Series, (Statistics #2006-2)—44pages.

(Continued)

*Primary Examiner* — Robert W Beausoliel, Jr.
*Assistant Examiner* — Cheryl M Shechtman
(74) *Attorney, Agent, or Firm* — Maschoff Brennan

(57) ABSTRACT

An automated computer implemented method of deduplicating point of interest of computer implemented database including: standardizing data of a pair of records, wherein equivalent words with different spelling may be normalized to a single spelling; classifying the pair of records into a category of pre-defined address categories; carrying out a category specific determination of non-duplicate and failing to determine that the pair of records may be a category specific non-duplicate; tokenizing the data of the pair of records into a pair of tokenized records; determining that core words of the pair of records are linked by computing scores of cross information and distance; and determining whether the scores pass a pre-determined threshold. An aspect of the disclosure relates to an electronic data pro- (Continued)

cessing system, a data processing apparatus, a non-transitory computer-readable medium, and a computer executable code for deduplicating point of interest of computer implemented database.

17 Claims, 11 Drawing Sheets

(56) References Cited

U.S. PATENT DOCUMENTS

| | | | |
|---|---|---|---|
| 9,262,438 B2 | 2/2016 | Agrawal et al. | |
| 10,659,911 B1 | 5/2020 | Wang et al. | |
| 11,625,555 B1* | 4/2023 | Zhiyanov | G06F 18/24 706/20 |
| 2008/0077573 A1 | 3/2008 | Weinberg et al. | |
| 2014/0258293 A1* | 9/2014 | Wong | G01C 21/3679 707/737 |
| 2016/0048770 A1* | 2/2016 | Thomas | G06F 40/284 707/706 |
| 2020/0034655 A1 | 1/2020 | Gupta et al. | |
| 2020/0137512 A1* | 4/2020 | Wang | G01C 21/3841 |
| 2020/0183900 A1 | 6/2020 | Iska et al. | |
| 2021/0018332 A1* | 1/2021 | Zhu | G06N 3/08 |
| 2021/0334275 A1* | 10/2021 | Smart | G06F 16/2456 |
| 2023/0118627 A1* | 4/2023 | Sunderrajan | G01C 21/3811 701/454 |

OTHER PUBLICATIONS

Philip Bohannon et al.,"Deduplicating a Places Database" 2014, 10 pages.
Rui Santos et. al.: "Learning to Combine Multiple String Similarity Metrics for Effective Toponym Matching" Jan. 2018; 29 pages.
Surajit Chaudhuri et. al.: "Robust and Efficient Fuzzy Match for Online Data Cleaning, Jun. 2003", 12 pages.
Dennis Thom et. al.: "Inverse Document Density: A Smooth Measure for Location-Dependent Term Irregularities, Dec. 2002", 16 pages.
Search Report and Written Opinion dated Jul. 26, 2021 which was issued by the Intellectual Property Office of Singapore in connection with SG10202100842W.
International Search Report and Written Opinion dated Feb. 24, 2022 which issued in connection with PCT/SG2022/050002.
Examination Report dated Aug. 2, 2022 which was issued by the Intellectual Property Office of Singapore in connection with SG10202100842W.
Extended European Search Report dated Feb. 2, 2024 which was received in connection with EP Patent Application No. 22746359.3.

* cited by examiner

| DATA STANDARDIZATION ||
|---|---|
| NON-STANDARDIZED DATA | STANDARDIZED DATA |
| STREET | ST |
| GANG II | GANG 2 |
| SIXTH AVENUE | 6 AVE |

FIG. 2

| DATA PARSING ||
|---|---|
| UNPARSED DATA | PARSED DATA |
| 28 SIN MING LN | HOUSE_NO: 28, STREET: SIN MING LN |

FIG. 3

| POI CLASSIFICATION | |
|---|---|
| DATA | CLASS |
| 93, JALAN SIDAKARYA | POINT ADDRESS |
| 28 SIN MING LN | POINT ADDRESS |
| ATM BANK ABANK | ENTITY |
| MARINA ONE | ENTITY |

FIG. 5A

| ROAD LABEL CHECKING | | |
|---|---|---|
| | EXAMPLE 1 | EXAMPLE 2 |
| RECORD 1 | BENCOOLEN STREET | LEONIE HILL |
| RECORD 2 | BENCOOLEN LINK | LEONIE HILL ROAD |
| RESULT | DIFFERENT ROADS | DIFFERENT ROADS |

FIG. 5B

| ENTITY CHECKING | |
|---|---|
| | DATA |
| RECORD 1 | FASTFOODCS BEAUTY WORLD |
| RECORD 2 | BEAUTY WORLD |
| Result | Different Entities |

FIG. 5C

| COMMON TOKEN LINKING | | |
|---|---|---|
| | TOKENS BEFORE LINKING | TOKENS AFTER LINKING |
| RECORD 1 | [ 'JL', 'BRIGJEN', 'KATAMSO' ] | [ '*', 'BRIGJEN', '*' ] |
| RECORD 2 | [ 'JL', 'BRIGADIR', 'JENDRAL', 'KATAMSO' ] | [ '*', 'BRIGADIR', 'JENDRAL', '*' ] |

FIG. 6

| SIMILAR TOKEN LINKING |||||
|---|---|---|---|
| | TOKENS BEFORE SIMILAR LINKING | CHECK CONCATEN. AND/OR COMPOUND WORD | TOKENS AFTER LINKING |
| RECORD 1 | [ '*', 'BRIGJEN', '*' ] | [ '*', 'BRIGADIR', 'JENDRAL', '*' ] | [ '*', '*', '*' ] |
| RECORD 2 | [ '*', 'BRIGADIR', 'JENDRAL', '*' ] | [ '*', 'BRIGADIR', 'JENDRAL', '*' ] | ['*', '*', '*', '*'] |

FIG. 8

| COMPARATIVE EXAMPLE |||
|---|---|---|
| | TOKENS | SCORES |
| RECORD 1 | [ 'FASTFOODCS', 'BEAUTY', 'WORLD' ] | [5.2, 6.2, 6.2] |
| RECORD 2 | ['BEAUTY', 'WORLD'] | [6.2, 6.2] |
| NOT LINKED TOKEN | FASTFOODCS | [5.2] |

FIG. 9

METHOD AND SYSTEM FOR DEDUPLICATING POINT OF INTEREST DATABASES

CROSS REFERENCE

The present invention is a 371 of International Application No. PCT/SG2022/050002, filed on Jan. 3, 2022, and claiming priority to Singapore Application No. 10202100842W filed on Jan. 26, 2021, incorporated by reference herein in its entirety.

TECHNICAL FIELD

An aspect of the disclosure relates to an automated, computer implemented, method of deduplicating point of interest of computer implemented database. Another aspect of the disclosure relates to an electronic data processing system for deduplicating point of interest of computer implemented database. Another aspect of the disclosure relates to a non-transitory computer-readable medium storing computer executable code. The present disclosure describes improvements in database technology, e.g., which may be used in logistics, transportation of goods, and car hailing.

BACKGROUND

Point of interest (POI) may refer to a physical location, for example an entity which location may be conveyed by latitude and longitude, and a name or an address. POI databases are the backbones of location based service.

POI datasets could be obtained via multiple sources, such as purchased from vendors or curated by human map operators. It is quite probable that there are duplicate records when the POI datasets from different sources are combined into one single database. Deduplicating a POI database is the process of identifying similar records in a POI database referring to the same real-world location and subsequently merging them together. POI datasets often contain different records that represent identical locations.

Existing methods of deduplicating POI databases still have a significant amount of false positives. Therefore, an improved method is envisaged.

SUMMARY

An aspect of the disclosure relates to an automated, computer implemented method, of deduplicating point of interest of computer implemented database. The method may be carried out by an electronic data processing system. The method may include standardizing data of a pair of records, wherein standardizing may include normalizing equivalent words with different spelling to a single spelling, for example by a replacement operation. The method may include classifying the pair of records into a category of pre-defined categories, for example the pre-defined categories may include one or both of a point address and an entity. The method may include carrying out a category specific determination of non-duplicate and determining whether the category specific determination is positive (thus determining that the pair of records are a non-duplicate, i.e., refer to distinct POIs) or not. The method may include failing to determine that the pair of records is a category specific non-duplicate. The method may include tokenizing the data of the pair of records into a pair of tokenized records. The method may include determining that core words of the pair of records are linked by computing a score of cross information and distance of the pair of records. The method may further include determining whether the score of cross information and distance pass a pre-determined cross information score threshold.

An aspect of the disclosure relates to an electronic data processing system for deduplicating point of interest of computer implemented database. The electronic data processing system may include a standardizer to standardize data of a pair of records, the standardizer may be configured to normalized equivalent words with different spelling to a single spelling, for example by a replacement operation. The electronic data processing system may include a classifier to classify the pair of records into a category of pre-defined categories, for example the pre-defined categories may include one or both of a point address and an entity. The electronic data processing system may include a category specific determiner to determine if the pair of records may be a category specific non-duplicate. The electronic data processing system may include a tokenizer too, if the category determiner failed to determine that the pair of records is a category non-duplicate, tokenize the data of the pair of records into a pair of tokenized records. The electronic data processing system may include a scorer. The scorer may be configured to compute a score of cross information and distance of the pair of tokenized records and to determine whether the core tokens of the pair of records may be linked or not and whether the pair of records is duplicate or non-duplicate.

An aspect of the disclosure relates to a data processing apparatus configured to carry out the computer implemented method of deduplicating point of interest of computer implemented database.

An aspect of the disclosure relates to a non-transitory computer-readable medium storing computer executable code including instructions for deduplicating point of interest of computer implemented database according to the computer implemented method of deduplicating point of interest of computer implemented database.

An aspect of the disclosure relates to a computer executable code including instructions for deduplicating point of interest of computer implemented database according to the computer implemented method of deduplicating point of interest of computer implemented database.

BRIEF DESCRIPTION OF THE DRAWINGS

The invention will be better understood with reference to the detailed description when considered in conjunction with the non-limiting examples and the accompanying drawings, in which:

FIG. 2 shows a table with an example of standardization in accordance with various embodiments;

FIG. 3 shows a table with an example of parsing in accordance with various embodiments;

FIG. 5A shows an example of classification of the pair or records into a category 300, in accordance with various embodiments;

FIG. 5B shows an example of street label checking in accordance with various embodiments;

FIG. 5C shows an example of entity checking in accordance with various embodiments;

FIG. 6 illustrates an example of common linking, in accordance with various embodiments;

FIG. 8 illustrates an example of similar linking, in accordance with various embodiments FIG. 9 shows a table with a comparative example, wherein entity checking is not implemented.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the method or system are analogously valid for the other methods or systems. Similarly, embodiments described in the context of a method is analogously valid for a system, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

Figure 1:
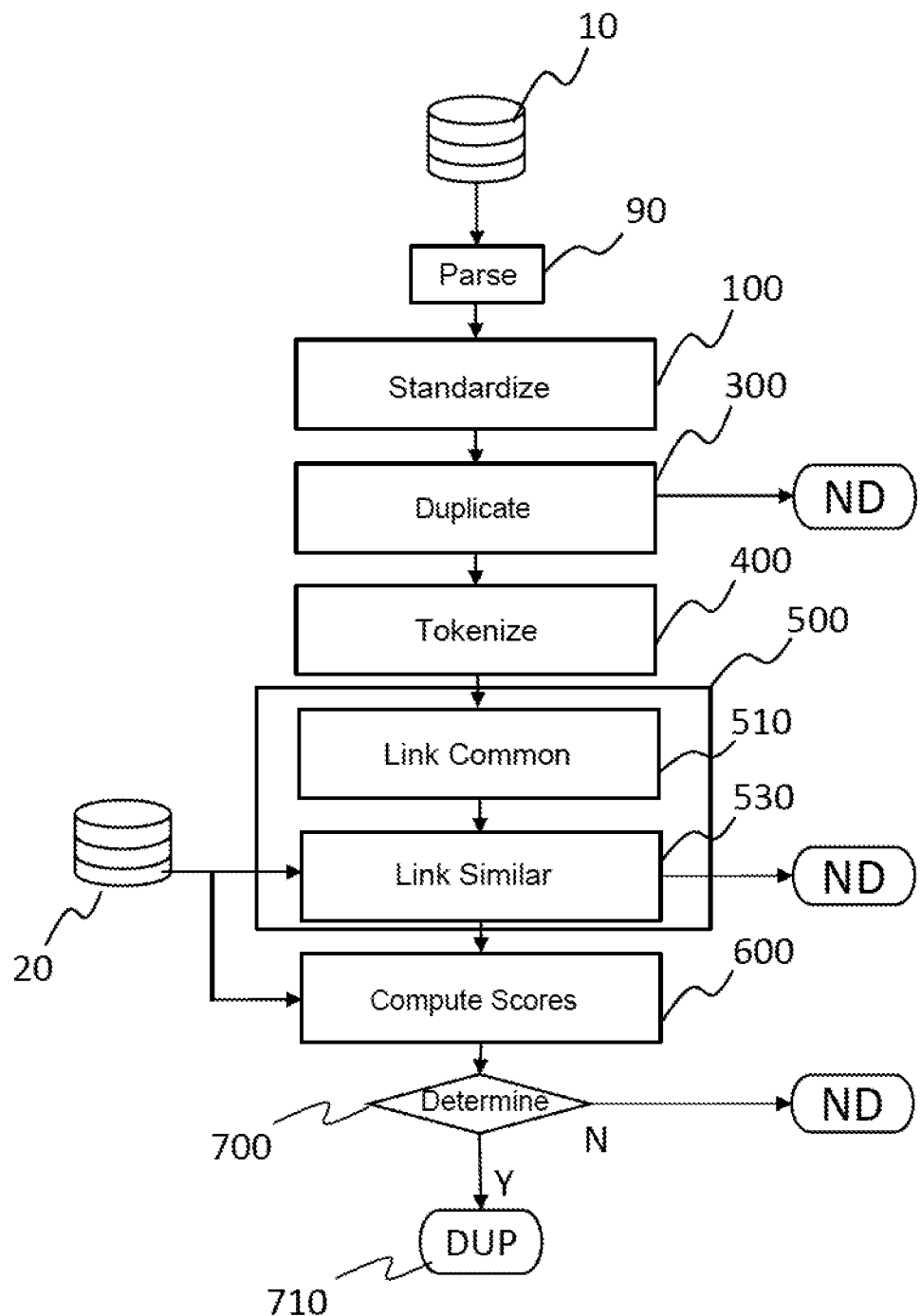
FIG. 1 shows an exemplary method in accordance with various embodiments.

According to various embodiments, an automated, computer implemented method, of deduplicating POI records of computer implemented database is described. Automated as used herein and in accordance with various embodiments may mean that all steps are carried out automatically by a computing system and each step is carried out automatically be the computing system, without requiring manual intervention, other than for example, instructing the computing system to carry out the method with a specific database and setting pre-determined parameters such as thresholds, if necessary. An exemplary method according to various embodiments is shown in FIG. 1 for illustration purposes. The method may be carried out by an electronic data processing system. The method may include standardizing 100 data of a pair of records, wherein standardizing may include normalizing equivalent words with different spelling to a single spelling, for example by a replacement operation. The pair of records may be originally stored in a POI database 10. The method may include classifying 200 the pair of records into a category of pre-defined categories, for example the pre-defined categories may include one or both of a point address and an entity. The method may include determining whether the category specific determination is positive or not. If the category specific determination of non-duplicate 300 is positive, then the pair of records are a non-duplicate, i.e., refer to distinct addresses, and thus distinct POIs. The method may include failing to determine that the pair of records is a category specific non-duplicate. The method may include tokenizing 400 the data of the pair of records into a pair of tokenized records. The method may include computing cross information scores 600 by computing the score of cross information and distance of the pair of records. The method may further include determining 700 whether the score pass a pre-determined cross information score threshold. As used herein and according to various embodiments, score of cross information and distance is also named as cross information score, for simplicity.

According to various embodiments, Point of Interest (POI) may be defined as any entity that has a physical location, for example conveyed by latitude and longitude, and a name or an address. POI datasets could be obtained via multiple sources, such as purchased from vendors or curated by human map operators.

As used herein and in accordance with various embodiments, databases and/or datasets may be stored in computer memory, for example in a cloud, or in a server, wherein physical storage may be, e.g., in a RAM, an HDD, an SSD, others, or combinations thereof.

A POI database as used herein, and in accordance to various embodiments may include a multiple (2 or more, e.g., 100000 or more) POI datasets, for example, formed by the addition of records from multiple POI datasets. A POI database to be deduplicated as used herein and in accordance with various embodiments has duplicate records, for example, the POI database may include a first record referring to address 1, a second record referring to address 2, a third record referring to entity 1, a forth record referring to entity 1, a fifth record referring to address 1, a sixth record referring to entity 3. In the example, first and fifth records (a pair of records) are a duplicate address, and third and fourth records (another pair of records) are a duplicate entity. The ordinal numbers are only used as distinction between the records but do not necessarily represent any order or sequence of the records.

As used herein, and in accordance with various embodiments, deduplicating a POI database is the process of identifying similar records in the POI database referring to the same real-world POI, such as entity or address, and subsequently merging them together, for example by deleting (or not bringing forward to a new deduplicated POI database) one of the records from the POI database, if the record to be deleted has additional information, then this additional information may be merged into the record to remain. The system and method allow for fast and reliable deduplication of large datasets in a short period of time, for example, a typical system may process over 1000 records/min, which would not be feasible by human deduplication.

According to various embodiments, a pair of records selected from the POI database for checking for duplicate may be selected based on their geographic distance, for example geohashes of both records may be compared to each other and latitude and longitude may be used to filter the records apart up to a certain distance, for example 50 meters, for deduplication checking. According to various embodiments, the method may include such a geofiltering (e.g. distance calculation) which may be performed for any combination of two records of the database and select the pairs for deduplication checking. Since comparison of geohashes is extremely fast with modern computers (e.g., it may take 10 milliseconds or less), the geofiltering does not slow the process but in fact, improves the speed in deduplication since only records apart up to a certain distance are compared, drastically reducing the possible number of record combinations.

As used herein, and in accordance with various embodiments, a token information score (also simply named herein as token score) may be computed by using an existing country specific POI data base. The less frequently the token appears, the higher the token score (the more information the token contains). Further details are explained herein, for example, in connection with the token score dictionary. The country specific database may include geo tile information. In case of more than one language for a same country, there may be one country database for each language, for the same country.

According to various embodiments, the method may include standardizing 100 data of a pair of records, wherein standardizing may include normalizing equivalent words with different spelling to a single spelling, for example by a replacement operation. An example of standardization is shown in FIG. 2, for illustration purposes. FIG. 2 shows a table with a column of non-standardized data and a column of standardized data. For example, a first record may include the term "STREET" which may be standardized into "ST", a second record may include the term "GANG II" which may be standardized into "GANG 2", and a third record may include the term "SIXTH AVENUE" which may be standardized into "6 AVE". According to various embodiments, standardization may be carried out in accordance to standardization rules which may be stored in a standardization dictionary. The standardization dictionary may be selected to be regional specific, for example, specific to a country and/or a language. According to various embodiments standardizing data of the pair of records may be based on one or both of: a country specific dictionary, and a language specific dictionary. Standardization may be implemented in computer code as substitutions. According to various embodiments, the deduplicated record (and the deduplicated POI database) may keep the standardized format, thereby providing better formatted records, which allows for easier further automated processing.

The method may further include, before classifying 200 the pair of records into a category, parsing 90 data of a pair of records, wherein parsing may include parsing the data into components that can be compared. The components may be pre-defined components, including for example: a reference to house number (e.g. "HOUSE_NO"), a reference to street name (e.g. "STREET"). FIG. 3 shows a table with a column of unparsed data and a column of parsed data. In the example, the unparsed data may be a string of "28 SIN MING LN" which may be parsed into "HOUSE_NO: 28, STREET: SIN MING LN". According to various embodiments, the deduplicated record (and the deduplicated POI database) may keep the parsed format, thereby providing better formatted records, which allows for easier further automated processing.

Exemplary data may be in the format of a string of characters, the figures show capitalized characters for illustration purposes, however the disclosure is not limited thereto. The string of characters may be stored in a computer readable format (e.g., in binary format), in computer memory, and may be processed by a processor. Examples illustrated herein are in human representation for ease of explanation, however, conversion to human readable format (e.g. on a mobile phone display) is not required in the system or method in accordance with various embodiments, and may occur, e.g., only when the data of the deduplicated POI database is accessed for human use.

According to various embodiments, carrying out a category specific determination of non-duplicate may include determining that the pair of records belongs to a same category. According to various embodiments, carrying out a category specific determination of non-duplicate may include a classification of the pair of records into a category, for example, determining to which category the pair of records belongs to.

According to some embodiments, carrying out a category specific determination of non-duplicate may include determining that at least one record of the pair of records belongs to a non-point address category, in which case the pair of records is classified as non-point address category and the category specific determination of non-duplicate may include determining whether, or that, the pair of records refer to a same entity as will be explained further below by way of example.

According to various embodiments, the category may be a point address category. A point address may include, for example, a street label and a house number. A street label, as used herein and in accordance with various embodiments, may include the specific name and may further refer to the street types, non-limiting examples being: road, avenue, lane, link, hill, park, boulevard, jalan, lane, drive, combinations thereof. Point address POIs may refer to those with POI'S name including, e.g., consisting only of, address information, e.g., "93, JALAN SIDAKARYA" and "28 SIN MING LN". The category specific determination of non-duplicate 300 may include determining whether, or that, the pair of records (also named as point address records) refer to a same house number of a same street. The method may include determining if the point addresses have a different house number or a different street label. If any of the pair of house numbers or the pair of street labels are different then the category specific determination of non-duplicates is positive. If the category specific determination of non-duplicate 300 is positive, then the pair of records are a non-duplicate, i.e., refer to distinct addresses, and thus distinct POIs. The method may include failing to determine that the pair of point address records are not duplicated, therefore, failing to determine that the pair of records is a category specific non-duplicate. As used herein and in accordance with various embodiments the expression "failing to determine that" may mean that a result of the determination negative.

According to various embodiments, the category may be a non-point address category, and the category specific determination of non-duplicate 300 may include determining whether, or that, the pair of records (also named as entity address records) refer to a same entity, e.g., have identical entity labels. The method may include determining if the point addresses have a different entity label, if the entity labels are different then the category specific determination of non-duplicates is positive. If the category specific determination of non-duplicate 300 is positive, then the pair of records are a non-duplicate, i.e., refer to distinct entities, and thus distinct POIs. The method may include failing to determine that the pair of point address records are not duplicated, therefore, failing to determine that the pair of records is a category specific non-duplicate. Entity POIs may refer to all non-point address POI, e.g., "ATM BANK ABANK" and "MARINA ONE". Category classification allows for category specific optimization of the method in accordance with various embodiments, so that the pair of records can be category specific analyzed, which results in more accurate deduplication. According to various embodiments, the non-point address category checking may include a chain store checking. For example, if a chain store is present in one entity record and not in another entity record, they must not be duplicate. Checking specifically for chain stores may improve the overall method, since tokens in a chain store name would have low scores (due to many appearances) and would be overshadowed by other tokens which may result in false positives when simply using the scores of core tokens for determination of duplicates.

Figure 4A:
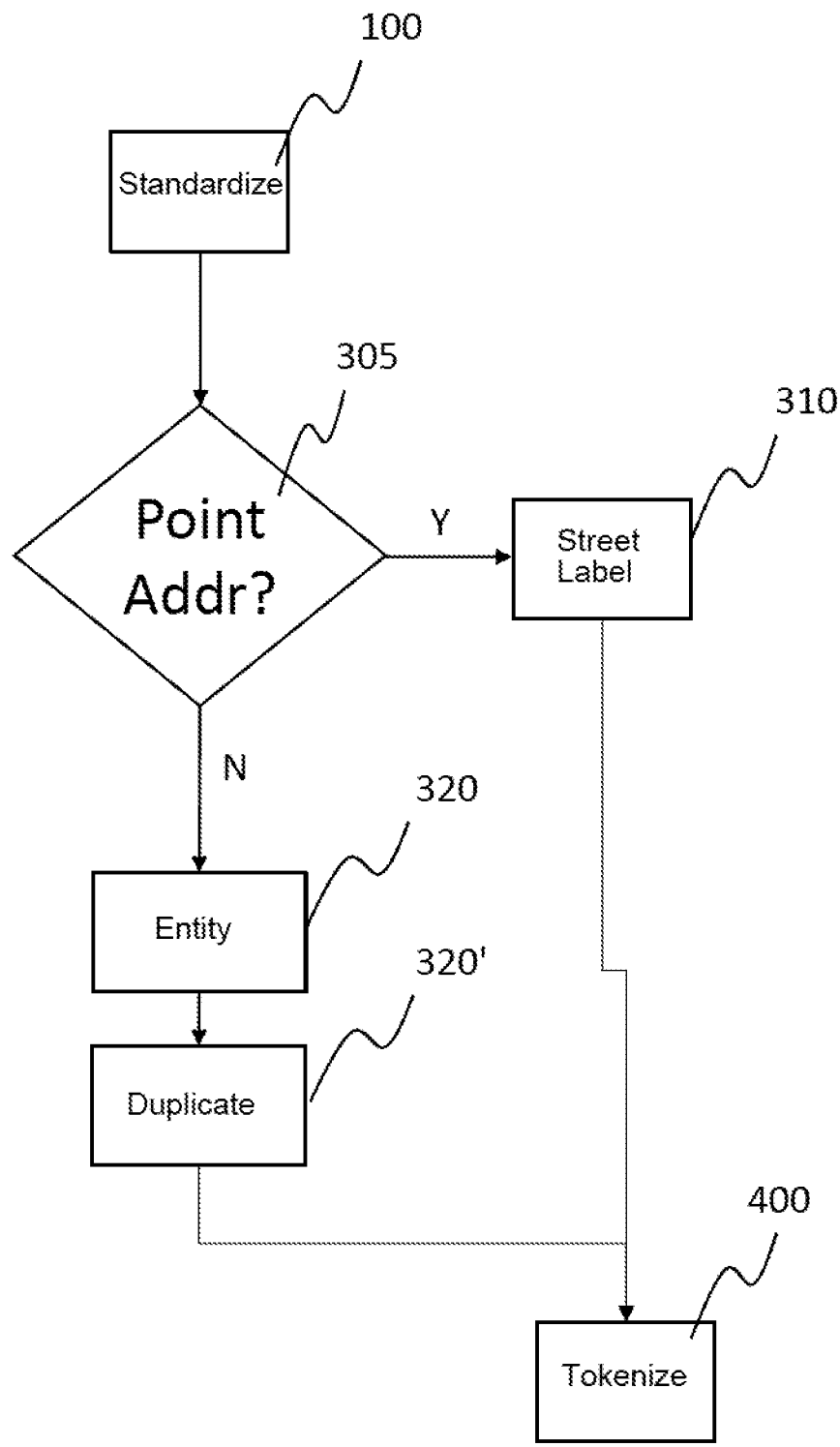
FIGS. 4A to 4C shows an exemplary flowchart for classification of the pair or records into a category 300, in accordance with various embodiments.
Figure 4B:
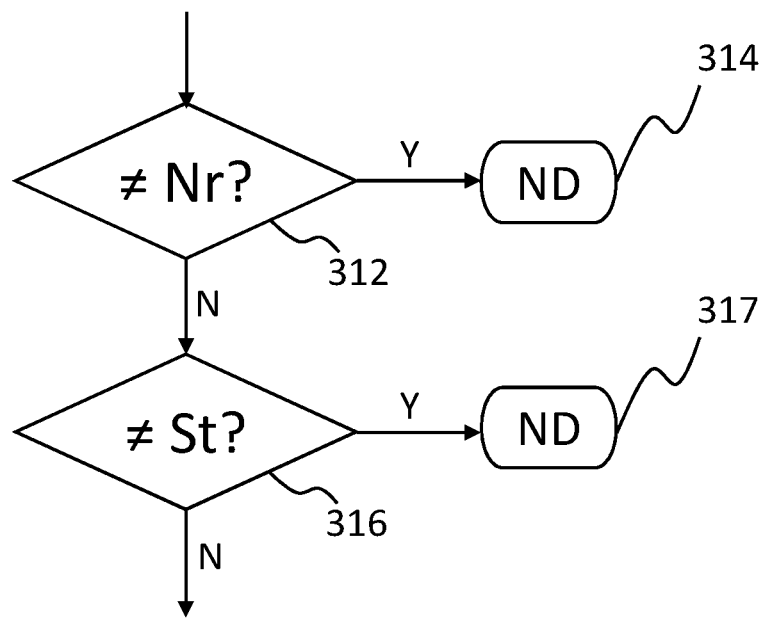
Figure 4C:
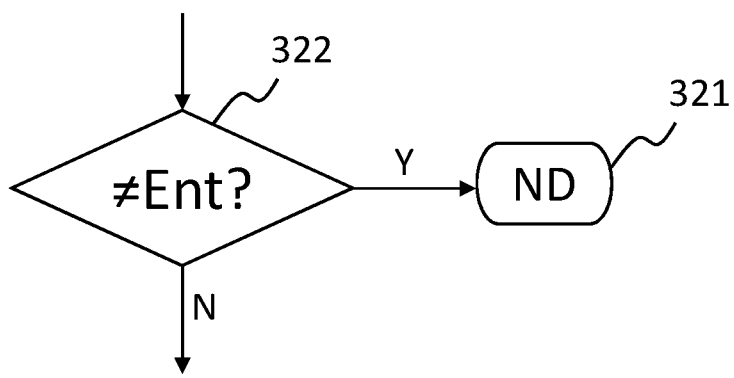

FIG. 4A shows an exemplary flowchart for classification 300 of the pair of records into a category, in accordance with various embodiments. The pair of records may have been processed with step 100 of standardization and/or parsing. In this example, the pre-defined categories include a point address and an entity. The pair of records is checked at the decision step 305 for point addresses ("Point Addr?"), if the check returns that the pair of records belong to a point address then the process continues with house number and street label checking step 310 (FIG. 4B, below). If the returns that the pair of records do not belong to a point address, then the process continues with entity checking step 320 (FIG. 4C, below).

According to some embodiments, instead of pair of records being checked at the decision step 305 for point addresses ("Point Addr?"), it is checked whether at least one record of the pair of records is a non-point address. If it is determined that at least one record of the pair of records is a non-point address, then the process continues with entity checking step 320, otherwise the process continues with house number and street label checking step 310. According to some embodiments, the method may further include a checking 320' to check whether (or that) the record being a point address is a duplicate of the record of being a non-point address, for example record A' may be a point address, the point address being the address of the entity in record B'. If the category specific determination of non-duplicate 300 is positive, then the pair of records are a non-duplicate, i.e., refer to distinct entities, and thus distinct POIs. If it is determined that the pair of records are a duplicate, this means that the category specific determination of non-duplicate has failed to determine that the pair of records are non-duplicated, the flow chart may proceed to tokenizer 400.

An example of classification of the pair of records into a category is shown with reference to FIG. 5A, where an exemplary table with data (DATA column) of the pair of data records and a respective class (CLASS column) are shown for illustration purposes. For the first pair of records it is determined that both records are a point address, for example, "93, JALAN SIDARKARYA" and "28 SI MING LN" both have street labels and house numbers. For the second pair of records it is determined that both records refer to an entity, for example, "ATM BANK ABANK" and "MARINA ONE" do not have street labels and house numbers.

FIG. 4B shows an exemplary flowchart 310 for determining if the pair of records belongs to different same point addresses. In decision step b 312 ("≠Nr?"), if it is determined that the house numbers are different ("Y" of 312) then the flowchart ends at 314 since it is determined that the pair of records do not form a duplicate and are a category specific non-duplicate, i.e., each record of the pair of records refer to a unique point address. If it is determined that the pair of records do not have different house numbers ("N" of 312), then decision step 316 ("≠St?") checks if the street labels are different, if it is determined that the street labels are different ("Y" of 316) then the flowchart ends at 317 since it is determined that the pair of records do not form a duplicate and are a category specific non-duplicate, i.e., each record of the pair of records refer to a unique point address. If it is determined that the pair of records do not have different street label ("N" of 316), this means that the category specific determination of non-duplicate has failed to determine that the pair of records are non-duplicated, the flow chart proceeds to tokenizer 400. While FIGS. 4A and 4B show one example of the category classification and category specific determination of non-duplicate, variations thereof are possible in accordance with various embodiments, for example, house number and street label may be checked in reverse order, or both may be checked and a logic comparison may determine whether at least one is different among the pair of records. For example, if two point address records' house numbers are different, they must not be duplicate. In some countries, for example, Singapore, different road labels indicate different roads, such as "BENCOOLEN STREET" and "BENCOOLEN LINK". So street label checking is performed for this country. In accordance with various embodiments, street label checking may be country specific.

An example of street label checking is shown with reference to FIG. 5B, where an exemplary table is shown with rows RECORD 1, RECORD 2 (which form the pair of records) and a rows RESULT which is the result of label checking. Examples are shown for 2 pairs of records, in Example 1 with a first pair of records, RECORD 1 includes "BENCOOLEN STREET" and RECORD 2 includes "BENCOOLEN LINK", the street labels are determined as being different ("DIFFERENT ROADS"). In Example 2 with a second pair of records, RECORD 1 includes "LEONIE HILL" and RECORD 2 includes "LEONIE HILL ROAD", the street labels are also determined as different ("DIFFERENT ROADS"). Example of street label tokens that refer to different streets may be street types, such as: road, avenue, lane, link, hill, park, boulevard, jalan, lane, drive, combinations thereof, and others.

FIG. 5C shows an exemplary flowchart 320 for determining if the pair of records belongs to different entities. In decision step 322 ("≠Ent?"), the entities are compared (for example by comparing the entity labels), if it is determined that the entity labels are different ("Y" of 322) then the flowchart ends at 321 since it is determined that the pair of records do not for a duplicate, i.e. each record of the pair of records refer to a unique entity. If it is determined that the pair of records are not different (e.g., refer to a same entity) ("N" of 322), this means that the category specific determination of non-duplicate has failed to determine that the pair of records are non-duplicated, the flow chart proceeds to tokenizer 400. While FIG. 4C shows one example of the category specific determination of non-duplicate, variations thereof are possible in accordance with various embodiments.

An example of entity checking is shown with reference to FIG. 5C, where an exemplary table is shown with rows RECORD 1, RECORD 2, which form the exemplary pair of records. In the example, RECORD 1 has "FASTFOODCS BEAUTY WORLD" and RECORD 2 has "BEAUTY WORLD". The category specific determination result is that both records are representing different entities, as RECORD 1 represents the chain store FastfoodCS, while RECORD 2 does not.

Referring back to FIG. 4A-4C, if the method has determined that the pair of records are category specific non-duplicates, then flowchart 300 can end with the determination that the pair of records are non-duplicates (314, 317, 321), i.e., the records of the pair of records refer to distinct POIs. Otherwise, if the category specific determination of non-duplicate has failed to determine that the pair of records is a category non-duplicate, the method proceeds to tokenize 400.

According to various embodiments, tokenizing 400 the pair of records may mean splitting the data (e.g., in the form of a string) into individual tokens. According to various embodiments, the tokenizing 400 may be country specific and/or language specific. The splitting may be performed by using punctuation and space as token splitter (e.g. 32 in binary as the token splitter). For some countries (e.g., Thailand) which do not use space to separate words, language-specific tokenizers may be utilized. According to various embodiments, tokenizing may be country and/or language specific and the tokenizer may be a country and/or language specific tokenizer. According to various embodiments, the pair of records after tokenizing 400 may also be named as pair of tokenized records. According to various embodiments, tokenizing may be implemented with computer string manipulation functions. The tokenizer splits the data of a record (e.g., as a string) into individual tokens (e.g. words), the tokenized record may be stored and processed in a computer format, for example the individual tokens may be delimited by a binary code delimiter, have an individual memory pointer or pointer offset, etc. Tokenizing prepares the data allowing for computer token-by-token analysis among the records, e.g. linking.

According to various embodiments, linking 500 may include linking common tokens 510 of the pair of tokenized records and may further include linking similar tokens 530 of the pair of tokenized records.

According to various embodiments, linking common tokens may include marking the tokens appearing in both records of the pair of tokenized records as linked, for example by replacing the common tokens with "*" in each of the token array of the pair of tokenized records thereby providing a commonly linked pair of records.

An example of common linking is illustrated with FIG. 6, which shows a table with exemplary data. The table of FIG. 6 includes a RECORD 1 and a RECORD 2 which form the pair of records. In one column ("TOKENS BEFORE LINKING"), the pair of tokenized records has the data ['JL', 'BRIGJEN', 'KATAMSO'] and ['JL', 'BRIGADIR', 'JENDRAL', 'KATAMSO'], for records 1 and 2 respectively. The column "TOKENS AFTER LINKING" shows the commonly linked pair of records resulting from the common liking, wherein 'JL' and 'KATAMSO' are linked resulting in ['*', 'BRIGJEN', '*'] and ['*', 'BRIGADIR', 'JENDRAL', '*']. The asterisk ("*") is used as an example only, and another symbol or another means of linking may be employed in accordance with various embodiments.

Figure 7:
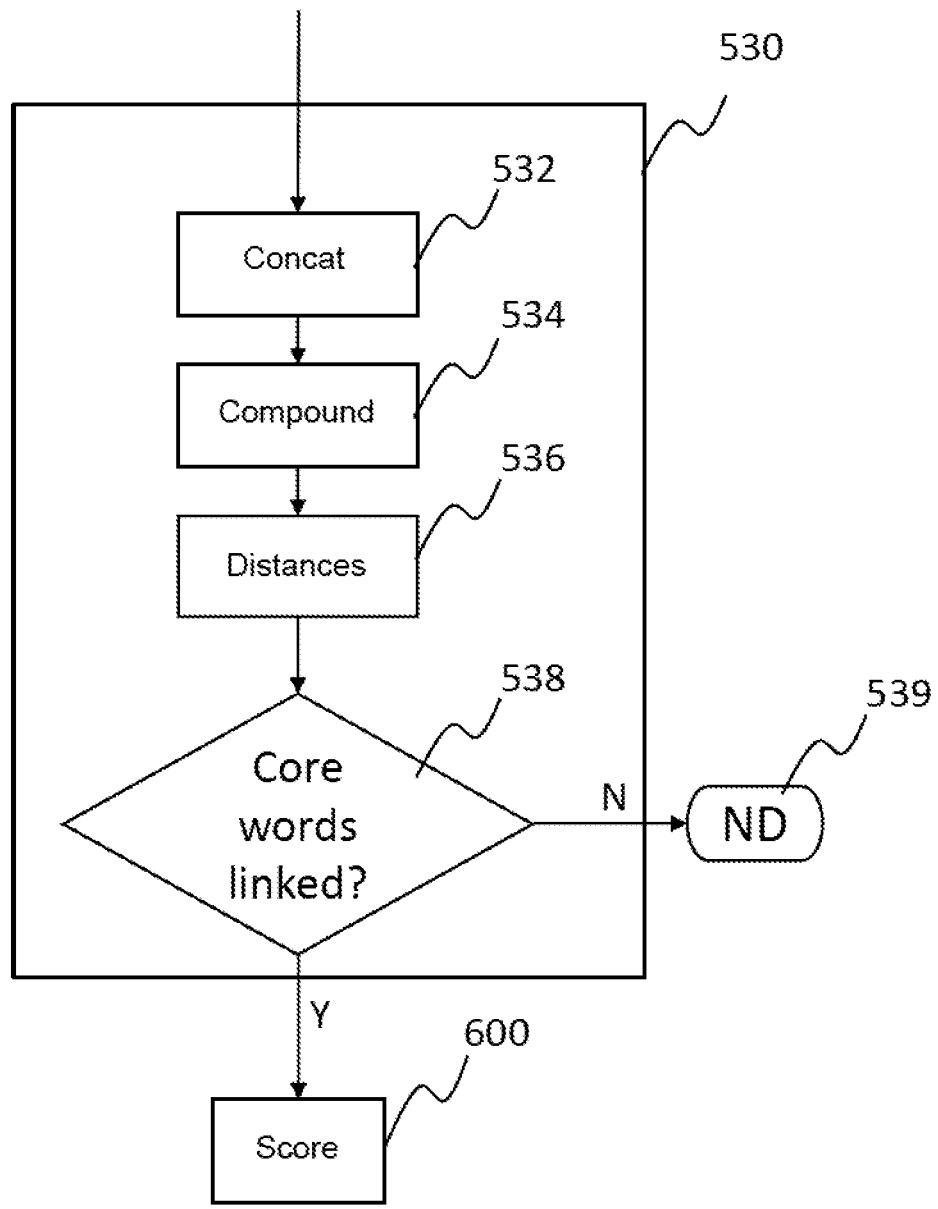
FIG. 7 shows a flowchart for linking similar tokens 530, in accordance with various embodiments.

FIG. 7 shows a flowchart for linking similar tokens 530, wherein variations between the tokens are taken into consideration. According to various embodiments, linking similar tokens 530 may include checking for concatenation 532. Alternatively or in addition, linking similar tokens 530 may include checking for compound words 534. According to various embodiments linking similar tokens 530 may include computing edit distances 536 and, based on the edit distances, determining 538 that the core words are linked ("Y" of 538) or that the core words are not linked ("N" of 538) and are therefore not a duplicate (end 539). According to various embodiments, linking similar tokens 530 may be configured to score compare tokens amongst both records for identifying and linking compound tokens, which may include calculating a similarity score. Said rules may be country specific, accordingly, the method may include determining the country and applying the country specific rules. In an example, said rules may be provided in a memory which is accessible when linking 530 similar tokens score. According to various embodiments, linking similar tokens 530 may be configured to compare tokens amongst both records for identifying and linking concatenated tokens. In examples, a concatenation may be identified by Levenshtein and/or Jaro-Winkler similarity. If it is determined that the core words are linked ("Y" of 538), the method may proceed to computing cross information scores 600. FIG. 7 illustrates linking according to one example, however variations are also possible in accordance with various embodiments, for example, checking for concatenation and for compound words can be carried out in reverse order, or even together. Levenshtein similarity and Jaro-Winkler similarity may be implemented as computer code, e.g., as recursive algorithm, or, more efficiently, with matrix manipulation algorithm.

For example, for Indonesia, the rule for compound tokens may include taking the first 3 letters of the consecutive words to make a compound word. The rules may be different for specific countries. According to various embodiments, a default rule, which works for many countries, may include check whether the similarity score is 1.0.

As used herein, and in accordance with various embodiments, the similarity score may mean a score of similarity between tokens of different records of the pair or records. The similarity score may refer to Levenshtein similarity, in which case it may include two values: one is the edit distance needed to change string A (a token of one record) to string B (a token of the other record), this value is an integer number; another one is the normalized edit distance which is valued between [0, 1], which may e.g., be normalized to the length of the larger of the two strings (tokes).

According to various embodiments, linking similar tokens 530 may include checking for concatenation 532. Concatenations may be words that are joined and shortened. In an example 'BRIGJEN' is found to be the compound word of 'BRIGADIR' and 'JENDRAL'. Note that in the example of FIG. 6, the similar tokens are both at position 2 of the token sets.

According to various embodiments linking similar tokens 530 may include checking for compound words 534. Compound words may be written together, for example, without separator, with hyphen, or they may be written separated, e.g., by space. For example, the set of tokens ['MARKET', 'PLACE'] and ['MARKETPLACE'] may refer to a same location.

According to various embodiments, computing edit distances 536 determines the edit distance between similar tokens, of tokens from the pair of tokenized records, which may have been previously processed by common linking. A similarity score may be determined with the results of the computing edit distances 536, for example the similarity score calculation may be included in computing edit distances 536. Examples of methods for determination of edit distance are Jaro-Winkler distance, in which transpositions are computed, and Levenshtein, in which substitutions are computed or a mixture thereof.

According to various embodiments a condition of linking similar tokens may be that one token has at least half the length of the other, longer, token and their similarity score should pass a pre-determined similarity threshold. According to various embodiments, a length of a token may be measured as a count of characters. For example, in ['Aeonmall', '*', '*'] and ['Aeonmall', '*', '*'], 'Aeonmall' and 'Aeonmall' will be linked as similar tokens.

According to various embodiments, linking similar tokens 530 may include marking the tokens appearing in both records of the pair of tokenized records (for example the pair of commonly linked records) as linked, for example, by replacing the similar tokens with "*" in each of the token array thereby providing a similarity linked pair of records. The asterisk ("*") is used as an example only, and another symbol or another means of linking may be employed in accordance with various embodiments.

An example of similar linking is shown in connection with FIG. 8, for illustration purposes. Taking the commonly linked pair of records of FIG. 6, namely RECORD 1 being ['*', 'BRIGJEN', '*'] and RECORD 2 being ['*', 'BRIGADIR', 'JENDRAL', '*'], checking for concatenation and/or compound word results in ['*', 'BRIGADIR', 'JENDRAL', '*'] and ['*', 'BRIGADIR', 'JENDRAL', '*'], respectively. After carrying out linking of similar tokens, the resulting arrays are ['*', '*', '*'] and ['*', '*', '*', '*'] respectively, determining 538 that the core words are linked ("Y" of 538). A calculation of the similarity score may results into a similarity score, in this example [1.0], which is above the pre-determined similarity threshold, therefore the pair of records is determined to be a duplicate. In another example, when not all core words are linked, the determining 538 that the core words are linked fails by returning "N", which results in the pair of records being determined to not be a duplicate (end 539), i.e., being unique records.

According to various embodiments, determining 538 if the core words are linked may be used for entity comparison. According to various embodiments, determining 538 if the core words are linked may include to determine if any of the tokens (for example any of the first two tokens) of one record have been linked to the tokens in the other record, for example, if any of the tokens (for example any of the first two tokens) in both records are In one example, given token arrays ['ORTO'] and ['LOBBY', 'ORTO', 'YISHUN'], 'ORTO' is linked to 'ORTO'. The first token 'LOBBY' is not linked, however it has a score lower than 'ORTO' which means 'LOBBY' is less informative. In this case, the linking of 'LOBBY' is optional. Then this pair of records passes core words linking checking and the method may proceed to computing cross information scores 600.

Figure 10:
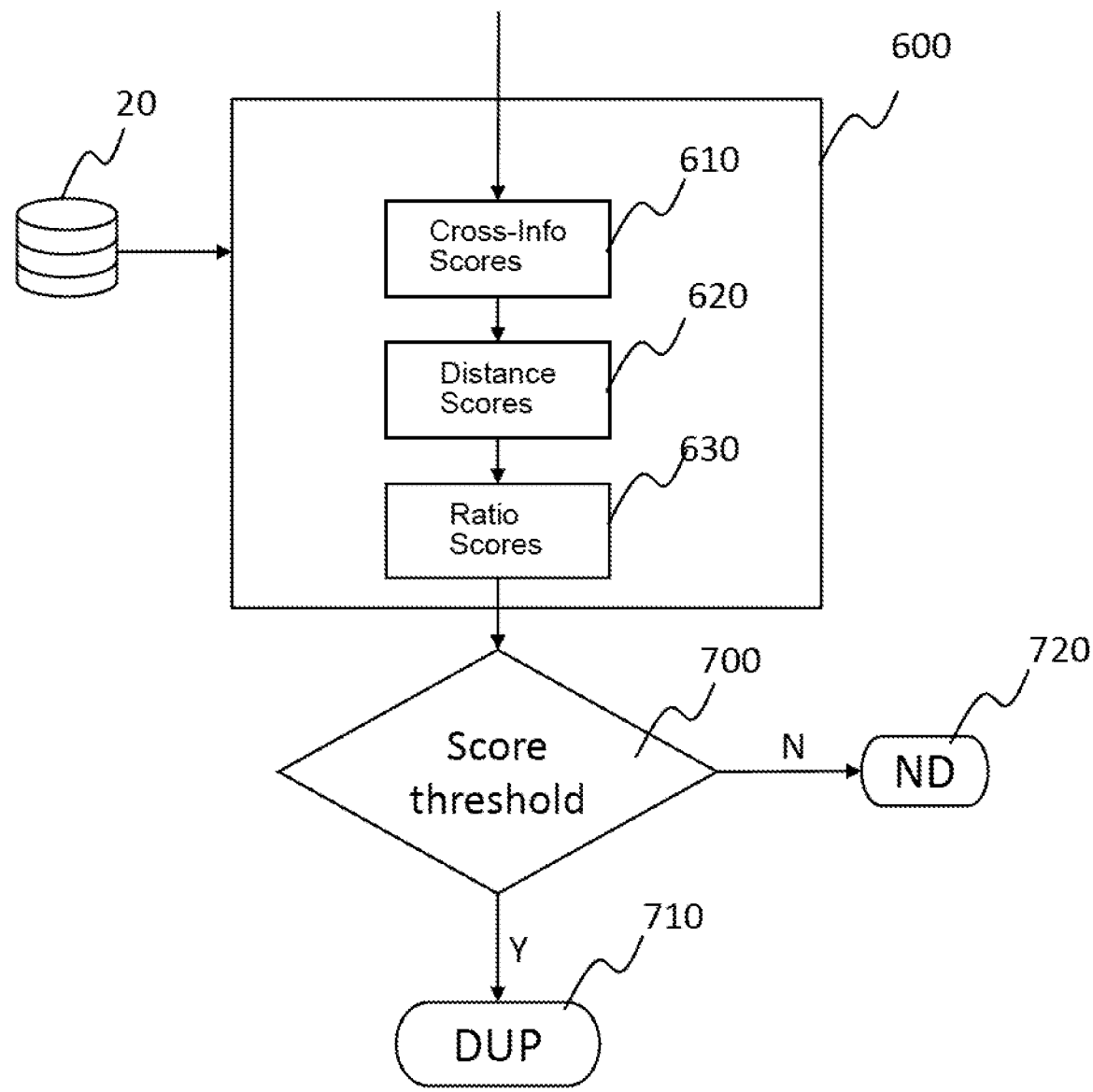
FIG. 10 illustrates an exemplary flowchart for computing cross information scores 600, in accordance with various embodiments.

Reference is made to FIG. 10 for illustration purposes. FIG. 10 illustrates computing cross information score according to one example, however variations are also possible in accordance with various embodiments. The method may include computing the cross information scores 600 of the token arrays. According to various embodiments, computing cross information scores 600 may include computing scores of cross information 610. Computing cross information scores 600 may include computing a score of edit distance 620 and/or ratio 630. The method may further include determining 700 whether the cross information score pass a pre-determined cross information score threshold (or simply named herein as cross info threshold). If the cross info score threshold is not passed, then the pair of records are not a duplicate. If the cross info score threshold is passed, then the pair of records are a duplicate. In the example of FIG. 10, which is shown for illustration purposes, if the cross info score threshold is not passed ("N" of 700), then the pair of records are not a duplicate ("ND") and the method proceeds to end 720. If the cross info score threshold is passed ("Y" of 700), then the pair of records are a duplicate ("DUP"), and the method may proceed to end 710.

According to various embodiments, a token score dictionary 20 may include country and/or language specific token and their score. The token dictionary may be stored in a computer memory which may be accessed by the scorer, for example, an electronic processor (e.g. a CPU), for computing cross information scores 600. The token score dictionary will be explained in more details further below.

According to various embodiments, one or more, for example, three distance metrics may be used to measure the similarity between a pair of records. According to various embodiments, the distance metrics may be selected from: cross information score, Levenshtein distance, and Levenshtein ratio. The cross information score may be used to measure the mutual information between the pair of records. According to various embodiments, all three distance metrics, cross information score (info_score), Levenshtein distance (edit_dist), and Levenshtein ratio (edit_ratio), may be used to measure the similarity between a pair of records (the pair of records including a record A and record B).

The cross information score (info_score) may be defined as:

$$\text{info\_score} = f(s_A, s_B) \quad \text{Eq(1)}$$

$$s_A = \frac{\sum_{t \in com} \text{token\_score}(t) + \sum_{t \in sim_A} \text{sim\_score}(t) \times \text{token\_score}(t)}{\sum_{t \in TA} \text{token\_score}(t)} \quad \text{Eq(2)}$$

$$s_B = \frac{\sum_{t \in com} \text{token\_score}(t) + \sum_{t \in sim_B} \text{sim\_score}(t) \times \text{token\_score}(t)}{\sum_{t \in TB} \text{token\_score}(t)} \quad \text{Eq(3)}$$

wherein: com represents the common token set of both records of the pair of records; $sim_A$ represents the tokens in record A that have a similar token linking with record B; $sim_B$ represents the tokens in record B that have a similar token linking with record A; sim_score(t) represents a similarity score of the linked similar tokens; TA represents the token set of record A; TB represents the token set of record B.

In above equations, $s_A$ and $s_B$ represent the mutual information in record A and record B, respectively. The cross information score is a hybrid of $s_A$ and $s_B$. Examples of hybrid functions include harmonic mean or maximum function, such as:

$$f_{score} = \frac{2}{\frac{1}{s_A} + \frac{1}{s_B}} \quad \text{Eq(4)}$$

$$f_{score} = \max(s_A, s_B) \quad \text{Eq(5)}$$

According to various embodiments, determining whether the cross information score pass the cross info threshold may include using one or more, for example all of: info_score, edit_dist, and edit_ratio, to compare with the cross info threshold to decide whether a pair of records are duplicate.

The cross info threshold may be composite (named herein as "composite score"), i.e., include one or more of: an info_score threshold ($th_1$), an edit_dist threshold ($th_2$), and an edit_ratio threshold ($th_3$). For example, the cross information score may pass the cross info threshold when info_score>$th_1$ or (edit_ratio>$th_2$ and edit_dist<$th_3$), wherein calculation of info_score may be according to Eq(1) to Eq(5), but is not limited thereto. If the cross info threshold is not passed, then the pair of records are not a duplicate. If the cross info threshold is passed, then the pair of records are a duplicate. In another example, the composite score may be weighted according to its factor loading and may be based on $C_1$×info_score+$C_2$×edit_ratio, wherein $C_1$, and $C_2$ are constant factors. The computation of cross information score allows for electronic comparison of tokens (by a machine) and may be implemented in the form of instructions for a computer.

According to various embodiments, the token score dictionary (or simply dictionary) may include a plurality of entries, each entry for a token, and may include information on the respective country and score associated with that token. For example, the dictionary may cover the tokens that have appeared in the POI database for more than 2 times, the number of times may be configurable. The token score dictionary looks may include a plurality of entries in the format {(country_id, token): token_score} where the key is the tuple of (country_id, token) such as ('SG', 'st'), and the value is the token_score which is a float number such as 0.00001. Herein, "country_id" represents a country identification, and "token_score" represents a token score. According to various embodiments, infrequent tokens and unseen tokens, may receive a default score, which may be assigned to the token assuming the token only appears one time.

According to various embodiments, a token score (e.g. token_score) may be calculated when creating the dictionary and/or may be calculated when adding or updating an entry to the dictionary. The token score dictionary may be used to compute the cross-information score of two token arrays.

Token score reflects the amount of information expressed in a token. The higher the score is, the more informative the token is. The token score is defined, per country as:

$$\text{token\_score}(t) = f_{token}\left(\frac{N}{df_g(t)}, \frac{N_l}{df_l(t)}\right) \quad \text{Eq (6)}$$

wherein: N is the total number of POIs in one country specific POI database, which N may be pre-defined; $df_g(t)$ is the number of records in the country specific POI database that contains term t; $N_l$ is the total number of local records, e.g., total number of records in geo tile l; and $df_l(t)$ is the number of local records (e.g., records in geo tile l) that contain term t. The country specific POI database may include geo tile information. Index l may refer to geotile and index g may refer to global. In case of more than one language for a same country, there may be one country specific POI database for each language, for the same country. The country specific POI database may be a pre-existing database.

An example of $f_{token}$ is:

$$f_{token} = \lambda \log \frac{N}{df_g(t)} + (1-\lambda)\log\frac{N_l}{df_l(t)} \quad \text{Eq (7)}$$

wherein $\lambda$ is the weight of blending global and local inverse document frequency, and may take the value from [0, 1]. In some embodiments, the token score may be a hybrid of global inverse document frequency and local document frequency. A weighted sum is an example of the hybrid function. Introducing local inverse document frequency allows to correctly estimate the token's information within spatial context.

For example, given a record "Premium Outlet Phuket Ecco", the most informative word should be 'Ecco'. However, tokens ['Premium', 'Outlet', 'Phuket'] might be hardly seen from other Thailand regions other than this shopping mall region and they might also have high information scores and overshadow the core word 'Ecco'. By adding the component of local inverse frequency, the information score of ['Premium', 'Outlet', 'Phuket'] would be reduced because there are many local POIs containing those words.

In a comparative example, the importance of entity checking is shown. Referring to FIG. 9, where an exemplary table is shown with rows RECORD 1, RECORD 2 (which form the pair of records) and a rows shown the token that is unlinked ("NOT LINKED TOKEN"). The columns show the tokens for each record and their associated scores. In the example, RECORD 1 has ['FASTFOODCS', 'BEAUTY', 'WORLD'] and RECORD 2 has tokens ['BEAUTY', 'WORLD']. Token scores for ['FASTFOODCS', 'BEAUTY', 'WORLD'] are [5.2, 6.2, 6.2]. Linking common tokens and comparing similarity scores would result in token 'FASTFOODCS', which represents a fast food chain store named FastfoodsCS, being not linked. Because the token score of 'FASTFOODCS' is less ([5.2]) than the token score of 'BEAUTY' ([6.2]), so 'FASTFOODCS' would not be considered as the core token and its linking is optional. Therefore, category specific comparison, such as entity checking, allows to identify both entities as separated POIs, otherwise the cross information score of both tokens would pass the cross info threshold and both records would be decided as a duplication.

According to various embodiments, an electronic data processing system for deduplicating point of interest of computer implemented database is described. The electronic data processing system may include a standardizer to standardize 100 data of a pair of records, the standardizer may be configured to normalize equivalent words with different spelling to a single spelling, for example as previously described, such as by a replacement operation. The electronic data processing system may include a classifier to classify 200 the pair of records into a category of pre-defined categories, for example, as previously described. In examples, the pre-defined categories may include one or both of a point address and an entity. The electronic data processing system may include a category specific determiner to determine 300 if the pair of records may be a category specific non-duplicate, for example, as previously described. The electronic data processing system may include a tokenizer to, if the category determiner failed to determine that the pair of records is a category non-duplicate, tokenize 400 the data of the pair of records into a pair of tokenized records, for example, as previously described. The electronic data processing system may include a scorer. The scorer may be configured to compute scores of cross information and distance of the pair of tokenized records and to determine 700 whether the core tokens of the pair of records may be linked or not and whether the pair of records is duplicate or non-duplicate, for example, as previously described.

According to various embodiments, the classifier may be configured to determine that the pair of records belongs to a same category. According to various embodiments, the classifier may be configured to classify the pair of records into a category, for example, determining to which category the pair of records belongs to.

According to various embodiments, the category may be a point address category, and the category specific determiner may be configured to determine whether, or that, the pair of records (also named as point address records) refer to a same house number of a same street. The category specific determiner may be configured to determine if the point addresses have a different house number or a different street label, as previously explained. If any of the pair of house numbers or the pair of street labels are different then the category specific determination of non-duplicates is positive. If the category specific determination of non-duplicate 300 is positive, then the pair of records are a non-duplicate, i.e., refer to distinct addresses, and thus distinct POIs. Failing to determine that the pair of point address records are not duplicated, results in failing to determine that the pair of records is a category specific non-duplicate.

According to various embodiments, the category may be a non-point address category, and the category specific determiner may be configured to determine whether, or that, the pair of records (also named as entity address records) refer to a same entity, e.g., have identical entity labels. The category specific determiner may be configured to determine if the point addresses have a different entity label, if the entity labels are different then the category specific determination of non-duplicates is positive. If the category specific determination of non-duplicate 300 is positive, then the pair of records are a non-duplicate, i.e., refer to distinct entities, and thus distinct POIs. Failing to determine that the pair of point address records are not duplicated, results in failing to determine that the pair of records is a category specific non-duplicate.

Category classification allows for a more optimized electronic data processing system in accordance with various embodiments, in which the pair of records can be category specific analyzed. According to various embodiments, the non-point address category checking may include a chain store checking, and the category specific determiner may be configured accordingly. For example, if a chain store is present in one entity record and not in another entity record, they must not be duplicate. Checking specifically for chain stores may improve the overall results of the system, since tokens in a chain store name would have low scores (due to many appearances) and they will be overshadowed by other tokens and may result in false positives when simply using the scores of core tokens for determination of duplicates.

According to various embodiments, the electronic data processing system may further include a linker to link tokens of the pair of tokenized record.

According to various embodiments the linker may be configured to link common tokens of the pair of tokenized records. According to various embodiments the linker may be configured to link similar tokens of the pair of tokenized records. For example, linking similar tokens may be performed after linking common tokens.

According to various embodiments, the linker may be configured so that linking common tokens may include marking the tokens appearing in both records of the pair of tokenized records as linked as previously explained, for example, by replacing the common tokens with "*" in each of the token array of the pair of tokenized records thereby providing a commonly linked pair of records. The asterisk ("*") is used as an example only, and another symbol or another means of linking may be employed in accordance with various embodiments.

According to various embodiments, the linker may be configured to check for concatenation 532. Alternatively or in addition, the linker may be configured to check for compound words 534. Checking for concatenations and compound words may improve the linking step since concatenated and/or compounded words are also considered when linking.

According to various embodiments, the linker may be configured to determine the edit distance between similar tokens, of tokens from the pair of tokenized records, which may have been previously processed by common linking. A similarity score may be determined with the results of the computing edit distances 536, for example the similarity score calculation may be include in computing edit distances 536. Examples of methods for determination of edit distance are Jaro-Winkler distance, in which transpositions are computed or Levenshtein, in which substitutions are computed or a mixture thereof.

According to various embodiments a condition of linking similar tokens may be that the two similar tokens are within half the length of the longer token and their similarity score should pass a pre-determined similarity threshold. According to various embodiments, a length of a token or of a token array may be measured as a count of characters.

According to various embodiments, the linker may be configured so that linking similar tokens 530 may include marking the tokens appearing in both records of the pair of tokenized records (for example the pair of commonly linked records) as linked, for example, by replacing the similar tokens with "*" in each of the token array thereby providing a similarity linked pair of records. The asterisk ("*") is used as an example only, and another symbol or another means of linking may be employed in accordance with various embodiments.

According to various embodiments to standardize data of the pair of records may be based on one or both of: a country specific dictionary, and a language specific dictionary.

An aspect of the disclosure relates to a data processing apparatus configured to carry out the computer implemented method of deduplicating point of interest of computer implemented database.

An aspect of the disclosure relates to a non-transitory computer-readable medium storing computer executable code including instructions for deduplicating point of interest of computer implemented database according to the computer implemented method of deduplicating point of interest of computer implemented database.

An aspect of the disclosure relates to a computer executable code including instructions for deduplicating point of interest of computer implemented database according to the computer implemented method of deduplicating point of interest of computer implemented database.

Figure 11:
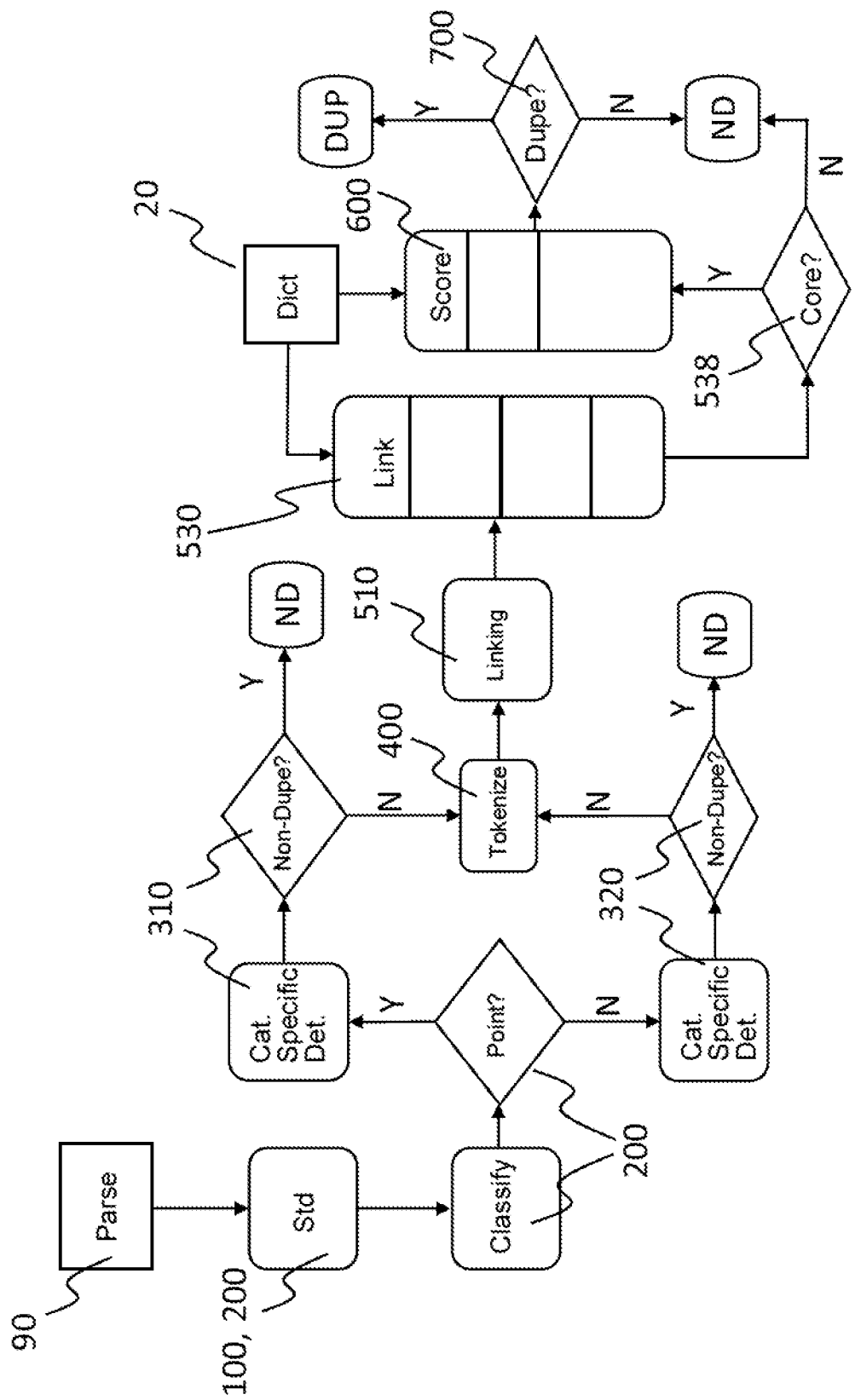
FIG. 11 shows one example of a flowchart in accordance with various embodiments.

FIG. 11 shows one example of a flowchart in accordance with various embodiments. The method may, starting with a pair of records 80, include parsing the pair of records 90 and/or standardizing the pair of records 100. The method may further include classifying the pair of records into a point address or an entity. If the classification results in a point address, then the method may proceed to the category specific determination of non-duplicate for point addresses 310 in which it is checked whether the pair of records have different street labels or different house numbers, if any of these are different then the pair of records is considered as a non-duplicate, otherwise if failing to determine that the pair of records is a category specific non-duplicate, the method proceed to 400. If the classification results in a non-point address, then the method may proceed to the category specific determination of non-duplicate for entities 320 in which it is checked whether the pair of records refer to different entities, if so, different then the pair of records is considered as a non-duplicate, otherwise if failing to determine that the pair of records is a category specific non-duplicate, the method proceed to 400. In tokenizer 400 then string of each of the pair of records is tokenized thus providing a pair of tokenized records, which tokens are linked for common tokens in 410 and linked for similarity in 530 among the pair of tokenized records. In 538 it is checked whether the core words are linked, if not all core words are linked then then the pair of records are not duplicated, otherwise, if all core words are linked, the method proceeds to computing cross information scores 600. The computed cross information scores are checked in 700 for determining whether the cross information scores pass a cross info threshold, if so, the pair of records are considered as a duplicate otherwise as not being duplicated.

Figure 12:
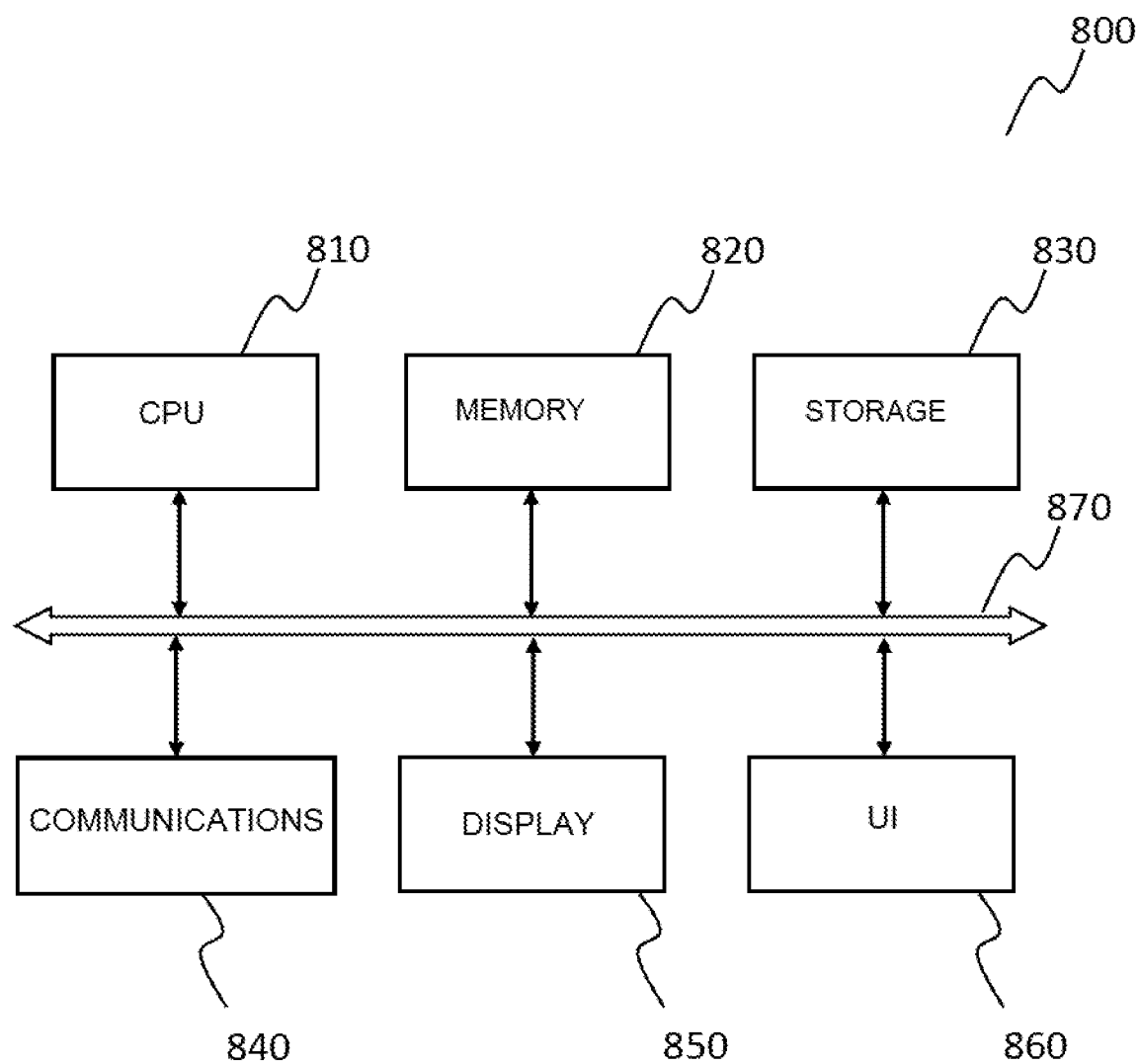
FIG. 12 shows an exemplary computer 800, which may be used in implementing the system or method in accordance with various embodiments.

FIG. 12 shows an exemplary computer 800, which may be used in implementing the system or method in accordance with various embodiments. For example, the system may or the method may be implemented on the computer 800. The computer 800 includes a bus 870 through to which devices may communicate with each other. In the example of FIG. 12, the following devices are shown connected to the bus 870: a microprocessor (CPU) 810; a main memory 820, for example a RAM; a storage device 830, for example a hard disk drive, a solid state drive, and/or a flash drive; a communication device 840, for example for wired or wireless communication, e.g. Ethernet; a display interface 850, and other user interfaces 860, for example for user input. However, the disclosure is not limited thereto, and more or less devices may be included in a computer, and the computer and/or computer bus may have other architectures than the one illustrated.

Described is a method and a system to deduplicate POI databases, which may combine edit distance schemes and token weighting schemes which leverages the strength of edit distances in handling spelling errors and abbreviations, and also leverages the strength of token weighting schemes in identifying the core tokens (tokens containing most information). The method and system allow for linking common and similar tokens across a pair of records, computing token information score with consideration of the local context and computing mutual information of a pair of records.

In linking common and similar tokens, Levenshtein and Jaro-Winkler edit distance may be used to select linking candidates, and such selection is shown herein to be robust to spelling errors or abbreviations. Mutual information may be computed based on the linked token pairs and token information score. Each token pair may be weighted by their information score which may be calculated based on the country context and the local (such as geohash) context.

The present disclosure describes improvements in database technology, e.g., which may be used in logistics, transportation of goods, transportation of persons, and car hailing. Each of the shown method and system disclosed herein describes enhanced deduplication of POI databases, the result of which may be used when a user is searching for a POI, e.g. during car hailing, offering substantial better search results and reducing the risk of selecting a wrong POI, thereby improving the overall efficiency of the application, e.g., improving the efficiency of a car hailing company.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An automated computer implemented method of deduplicating a dataset of point of interest records of point of an interest database including a plurality of point of interest records, the method comprising:
   automatically querying, by a processor, the point of interest database to identify pairs of records stored in the point of interest database associated with a point of interest, and for each identified pair of records:
   standardizing, by a processor-enabled standardizer configured to normalize equivalent text data of the pair of records;
   classifying, by a processor-enabled classifier configured to classify the pair of records into a category of pre-defined categories;
   executing, by a processor-enabled determiner configured to determine, based on the category classifying the pair of records, a category specific determination of non-duplicate to determine whether the pair of records is duplicated or not duplicated;
   in an instance the determiner fails to determine that the pair of records is not duplicated, executing a processor-enabled tokenizer configured to tokenize the data of the pair of records stored in the point of interest database into a pair of tokenized records in the point of interest database;
   determining, by a processor-enabled linker configured to link tokens of a pair of tokenized records, whether core words of the pair of tokenized records are linked;
   in an instance it is determined that the core words of the tokenized records are linked, modifying, by the processor, each of the tokenized records in the point of interest database with an indicator of the linking of the pair of tokenized records;
   in an instance it is determined that the core words of the tokenized records are linked, computing, by the processor, a score of cross information and distance of the pair of tokenized records;
   determining, by the processor, whether the score of cross information and distance passes a pre-determined threshold;
   in an instance the score of cross information and distance passes the pre-determined threshold, determining, by the processor, that the pair of records stored in the point of interest database is a duplicate and storing one of the pair of tokenized records in a deduplicated database;
   in an instance the score of cross information and distance does not pass the pre-determined threshold, determining, by the processor, that the pair of records is a non-duplicate and storing both of the pair of tokenized records stored in the point of interest database in the deduplicated database; and receiving, by the processor, a search request for a specified point of interest from a user computing device of a car hailing service provider;

searching the deduplicated database for the specified point of interest, the deduplicated database storing, based on the score of cross information and distance passed the pre-determined threshold, one or both of the pair of tokenized records of each of the identified pair of records in the point of interest database; and generating, by the processor in an instance the specified point of interest in the search request matches one or both of the pair of tokenized records, a result of the search of the deduplicated database for the specified point of interest via user interface including the matched one or both of the pair of tokenized records.

2. The method of claim 1, wherein the category is a point address category, and the category specific determination of non-duplicate comprises determining that the pair of records have identical street labels, and the category specific determination of non-duplicate comprises determining that the pair of records have identical house numbers.

3. The method of claim 1, wherein the category is a non-point address category and the category specific determination of non-duplicate comprises determining that the pair of records refer to a same entity.

4. The method of claim 1, further comprising linking tokens of the pair of tokenized records, wherein linking comprises:

linking common tokens of the pair of tokenized records; and linking similar tokens of the pair of tokenized records.

5. The method of claim 4, wherein linking similar tokens comprises at least one of (i) checking for concatenation; and (ii) checking for compound words.

6. The method of claim 4, wherein linking similar tokens comprises computing edit distances.

7. The method of claim 6, wherein determining whether core words are linked is based on the edit distances.

8. The method of claim 1, wherein standardizing data of the pair of records is based on one or both of: a country specific dictionary, and a language specific dictionary.

9. An electronic data processing system for duplicating point of interest data of a point of interest database including a plurality of point of interest records, the system comprising:

a processor configured to:

automatically query the point of interest database to identify pairs of records associated with a point of interest, and for each identified pair of records;

standardize, by a standardizer configured to normalize equivalent text, data of the pair of records, wherein equivalent words with different spelling are normalized to a single spelling;

classify, by a classifier configured to classify, the pair of records into a category of pre-defined categories;

determine, by a determiner configured to determine, executing a processor-enabled tokenizer configured to tokenize whether the pair of records is a category specific non-duplicate;

in an instance the determination is made that the pair of records is category non-duplicate, executing a tokenizer configured to tokenize the data of the pair of records stored in the point of interest database into a pair of tokenized records in the point of interest database;

determine, by a linker configured to link tokens of a pair of tokenized records, whether core tokens of the pair of tokenized records are linked or not;

in an instance it is determined that the core tokens of the tokenized records are linked, modifying, by the processor, each of the tokenized records in the point of interest database with an indicator of the linking of the pair of tokenized records;

wherein in an instance it is determined that the core tokens are linked, compute, by a scorer configured to score the pair of tokenized records, a score of cross information and distance of the pair of tokenized records and determines whether the score of cross information and distance passes a pre-determined threshold;

in an instance the score of cross information and distance passes the pre-determined threshold, determine that the pair of records stored in the point of interest database is a duplicate and storing one of the pair of records in a deduplicated database;

in an instance the score of cross information and distance does not pass the pre-determined threshold, determine that the pair of records is a non-duplicate and storing both of the pair of tokenized records in the deduplicated database;

receive a search request for a specified point of interest from a user computing device of a car hailing service provider;

search the deduplicated database for the specified point of interest, the deduplicated database storing, based on the score of cross information and distance passed the pre-determined threshold, one or both of the pair of tokenized records of each of the identified pair of records of the point of interest database; and generate a result of the search of the deduplicated database for the specified point of interest via user interface.

10. The electronic data processing system of claim 9, wherein the category is a point address category, and to determine if the pair of records is a category specific non-duplicate comprises at least one of (i) to determine if the pair of records have different street labels, and (ii) to determine if the pair of records have different house numbers.

11. The electronic data processing system of claim 9, wherein the category is a non-point address category and to determine if the pair of records is a category specific non-duplicate comprises determining if the pair of records refer to different entities.

12. The electronic data processing system of claim 9, wherein the processor is further configured to link tokens of the pair of tokenized records by performing processing to link common tokens of the pair of tokenized records; and link similar tokens of the pair of tokenized records.

13. The electronic data processing system of claim 12, wherein to link common tokens comprises at least one of:

checking for concatenated words;

checking for compound words.

14. The electronic data processing system of claim 12, wherein to link similar tokens comprises computing edit distances.

15. The electronic data processing system of claim 14, wherein to link similar tokens comprises determining that core words are linked based on the edit distances.

16. The electronic data processing system of claim 9, wherein to standardize data of the pair of records is based on at least one of: a country specific dictionary, and a language specific dictionary.

17. A non-transitory computer-readable medium storing computer executable code comprising instructions for deduplicating point of interest records of a point of interest database including a plurality of point of interest records according to a method, the method comprising:

automatically querying, by a processor, the point of interest database to identify pairs of records associated with a point of interest, and for each identified pair of records, standardizing, by a processor-enabled standardizer configured to normalize equivalent text, data of the pair of records;

classifying, by a processor-enabled classifier configured to classify the pair of records into a category of pre-defined categories;

executing, by a processor-enabled determiner configured to determine, based on the category classifying the pair of records, a category specific determination of non-duplicate to determine whether the pair of records is duplicated or not duplicated;

in an instance the determiner fails to determine that the pair of records is not duplicated, executing a processor-enabled tokenizer configured to tokenize the data of the pair of records stored in the point of interest database into a pair of tokenized records;

determining, by a processor-enabled linker configured to link tokens of a pair of tokenized records, whether core words of the pair of tokenized records are linked;

in an instance it is determined that the core words of the tokenized records are linked, modifying, by the processor, each of the tokenized records in the point of interest database with an indicator of the linking of the pair of tokenized records;

in an instance it is determined that the core words of the tokenized records are linked, computing, by a processor-enabled scorer configured to score the pair of tokenized records, a score of cross information and distance of the pair of tokenized records;

determining, by the processor, whether the score of cross information and distance passes a pre-determined threshold;

in an instance the score of cross information and distance passes the pre-determined threshold, determining, by the processor, that the pair of tokenized records is a duplicate and storing one of the pair of tokenized records stored in the point of interest database in a deduplicated database;

in an instance the score of cross information and distance does not pass the pre-determined threshold, determining, by the processor, that the pair of tokenized records is a non-duplicate and storing both of the pair of tokenized records in the deduplicated database;

receiving, by the processor, a search request for a specified point of interest from a user computing device of a car hailing service provider;

searching the deduplicated database for the specified point of interest, the deduplicated database storing, based on the score of cross information and distance passed the pre-determined threshold, one or both of the pair of tokenized records of each of the identified pair of records of the point of interest database; and generating, by the processor, a result of the search of the deduplicated database for the specified point of interest via user interface.

\* \* \* \* \*